United States Patent [19]

Ririe et al.

[11] 3,712,544

[45] Jan. 23, 1973

[54] ALIGNMENT MEANS FOR MOBILE IRRIGATION APPARATUS

[75] Inventors: Max H. Ririe, Gering; Murray C. Roland; Rich Olson, both of Scottsbluff, all of Nebr.

[73] Assignee: Lockwood Corp., Gering, Nebr.

[22] Filed: March 31, 1971

[21] Appl. No.: 129,793

[52] U.S. Cl. .................................. 239/177, 239/212
[51] Int. Cl. ............................................... B05b 3/00
[58] Field of Search ..................... 239/177, 212, 213

[56] References Cited

UNITED STATES PATENTS

| 3,500,856 | 3/1970 | Boone et al | 239/177 X |
| 3,606,161 | 9/1971 | Paul | 239/177 |
| 2,604,359 | 7/1952 | Zybach | 239/177 |
| 2,941,727 | 6/1960 | Zybach | 239/177 |
| 3,001,721 | 9/1961 | Zybach | 239/177 |
| 3,353,751 | 11/1967 | Dowd | 239/177 |
| 3,381,894 | 5/1968 | Purtell | 239/212 X |
| 3,417,766 | 12/1968 | Purtell | 239/212 X |

Primary Examiner—Lloyd L. King
Attorney—McDougall, Hersh & Scott

[57] ABSTRACT

A mobile irrigation apparatus formed of an elongate water distributing pipe having spaced sprinkling outlets and a plurality of laterally spaced apart mobile supports for movement of the distributing pipe over the land with means for maintaining substantial alignment between the supports during movement in one direction or the other.

3 Claims, 5 Drawing Figures

ALIGNMENT MEANS FOR MOBILE IRRIGATION APPARATUS

This invention relates to a self-propelled sprinkling system for large areas having a central source of water supply and it relates more particularly to a means for maintaining proper alignment of the self-propelled units embodied in the system.

Self-propelled sprinkling systems for irrigation of large areas are now well known. In a typical system, use is made of a main distributor pipe which may be as much as ½ mile in length, with the inner end portion of the pipe connected to a source of water for supply of water under pressure to sprinkling heads spaced along the length of the pipe for dispensing the water onto the crops in the field covered by the sprinkling system. The transmission pipe can be adapted to move across the field in a substantially straight line but it is usually mounted for rotation about a central pivot where one end of the distributor pipe is connected to the water supply. The distributor pipe is supported on a plurality of driven towers located at spaced intervals along the length of the distributor pipe and which operate to carry the pipe across the field. Typical systems are illustrated in United States patents to Zyback, U.S. Pat. No. 2,604,359; Behlen, U.S. Pat. No. 2,726,895; Bower et al. U.S. Pat. No. 3,394,729; Curtis, U.S. Pat. Nos. 3,352,403 and No. 3,352,439, and Dowd, U.S. Pat. No. 3,342,417.

In a system of the type described, it is important to minimize the amount of bending of the distributor pipe during its travel across the field, whether traveling in a straight line or in a path which radiates about a central pivot. Thus, it is desirable to maintain a semblence of alignment between the self-propelled towers on which the distributor pipe is mounted for support at longitudinally spaced points.

It is an object of this invention to provide a self-propelled irrigation system of the type described in which each of the intermediate mobile supports or towers for the distributor pipe embody simple efficient and reliable means for self-alignment with others of the mobile supports thereby to minimize the degree of misalignment between towers and/or the degree of bend as well as the total accumulated bending of the transmission pipe.

A further object of this invention is to provide a self-propelled irrigation system of the type described which is effective to maintain proper alignments between the mobile support units and which can be adjusted in a simple and efficient manner to reverse the direction of travel of the sprinkler system for operation over a segment of the area capable of being covered by the system or to reverse the direction by reason of an obstruction lying in the path of the sprinkler system, such as a wooded area, home, or the like.

These and other objects and advantages of this invention will hereinafter appear and, for purposes of illustration, but not of limitation, an embodiment of the invention is shown in the accompanying drawings in which:

FIG. 4$^a$ is a schematic elevational view of a modified form of alignment control.

Figure 1:
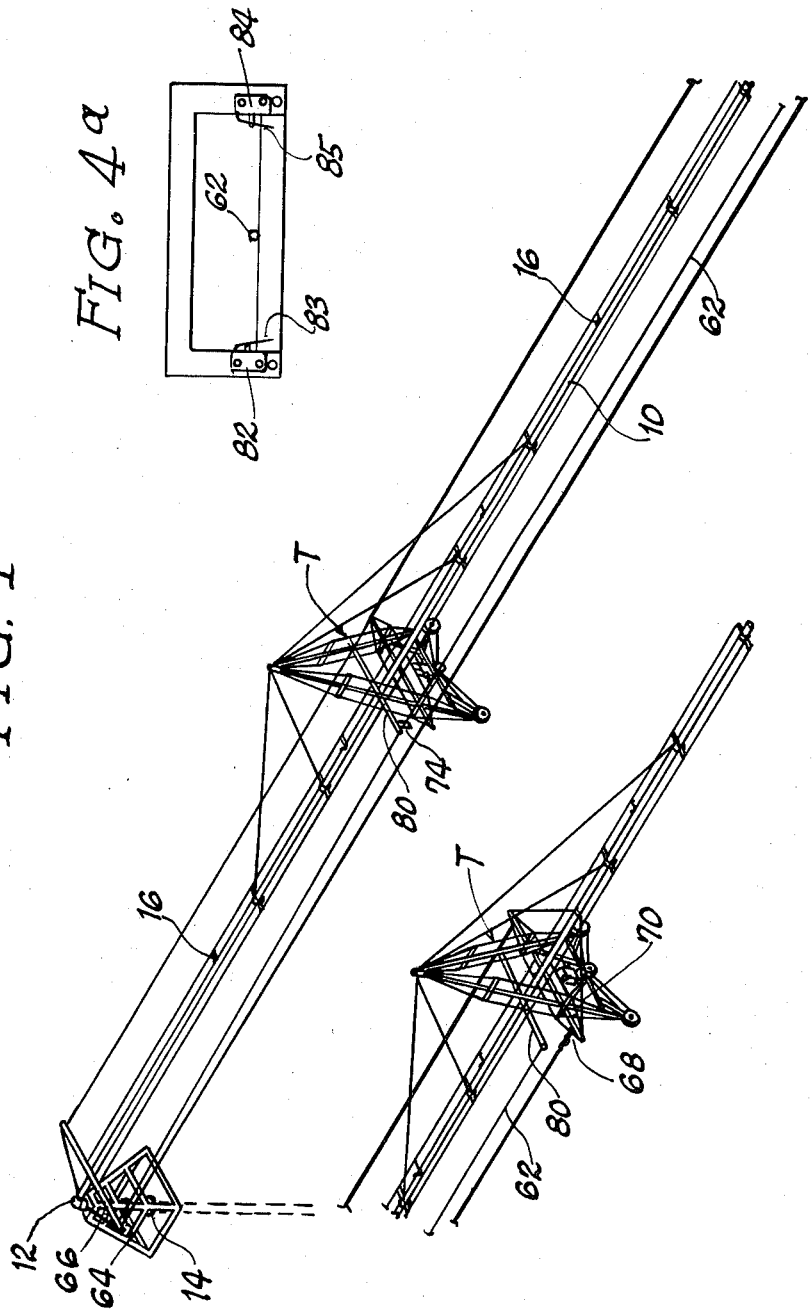
FIG. 1 is a perspective view of a self-propelled irrigation system embodying the features of this invention, showing the pivot end and the outer end section with the intervening portions omitted.

The invention will be described with reference to an irrigation system wherein the distributor pipe radiates about a central pivot but it will be understood that the concepts for alignment control between the mobile towers can be adapted in a system wherein the mobile support units are intended to travel in a straight line for unidirectional transport of the transmission line over all or a segment of the field. The invention will also be described with reference to the use as a control of the outermost of the mobile units in which the driving motor is adapted continuously to operate for movement of the outer mobile tower in the prescribed line of travel over the field but it will be understood that one or more other mobile units may be used as the control. It will be understood that the invention has application to sprinkling systems in which the distributor pipe is formed of a continuous section or of separate sections with flexible connections.

Referring now to the drawings for a description of the invention, the numeral 10 indicates the elongate horizontally disposed water distribution pipe which is provided with a swivel connection 12 at its inner end for pivotal attachment to the upper end of a feed pipe 14 which may extend downwardly to a well in the ground or which is otherwise supplied with water under pressure for irrigation, as from a stream, well or other source of water. Thus the feed pipe 14 represents the axis about which the water distributor pipe turns. Other means for pivotal attachment in sealing engagement between the distributor pipe and the feed pipe are well known by reason of the widespread utilization of such an arrangement in commercial practice, as illustrated in the aforementioned patents.

The distributor pipe 10 is provided with a plurality of spray nozzles 16 at frequently spaced intervals along the length of the pipe for operation as overhead sprays to sprinkle water onto the crop as the distributor pipe moves about the feed as its axis. The distributor pipe is supplied with water under pressure, as by means of a water pump connected with a supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support. It can rest on the tower as on a cradle rigidly secured to the support but, in accordance with the preferred practice of this invention, the distributor pipe 10 is rigidly connected with the support tower as by means of suitable straps 18 and struts 20.

The mobile tower is not a critical element of the invention since mobile towers of various constructions generally employed in the trade may be used. As a result, while the invention will be described with reference to a representative tower assembly, it will be understood that towers of different structures may be used.

Figure 2:
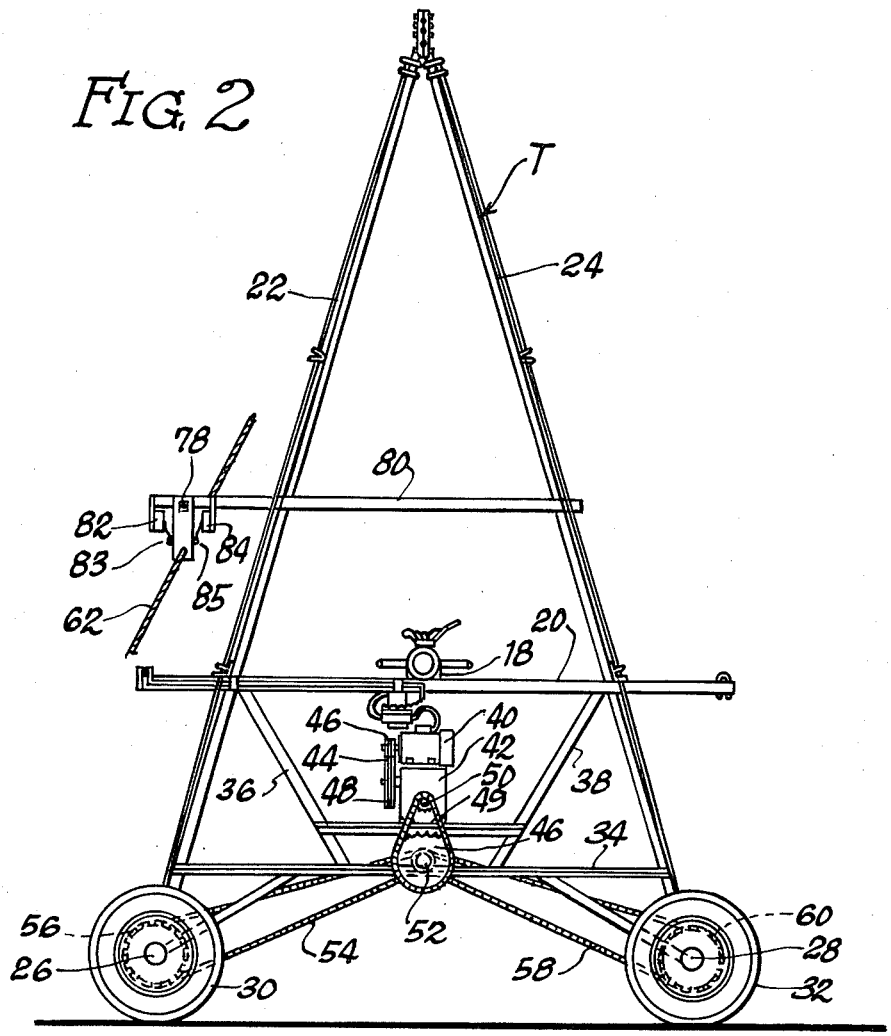
FIG. 2 is a side elevational view of an intermediate mobile support tower employed in the system of FIG. 1.

Each mobile tower is of substantially the same construction such that only one such representative mobile tower need be described in detail. Referring to FIG. 2 of the drawings, the mobile tower includes a vertically disposed A frame formed of legs 22 and 24 with bearings provided at their lower end portions having journals for receiving stub shafts 26 and 28 on which land-engaging wheels 30 and 32 respectively are mounted for wheeled support of the tower.

The legs 22 and 24 of the A frame are braced by one or more cross brace members 34 and 20 as well as struts 36 and 38 to provide a rigid structure of high structural strength. Supported between the cross brace members on the A frame is an electrical driving motor 40 which is operatively connected to a speed reducer 42, as by means of a driving belt or chain 44 which operates about a sprocket 46 on the end of the motor shaft and another sprocket 48 on the ingoing shaft of the speed reducer. The speed reducer is connected to the land-engaging wheels 30 and 32 for the transmission of rotational movement to the wheels. In the illustrated modification such transmission from the speed reducer to the wheels is effected by means of a sprocket 46 mounted for free rotational movement on the cross brace member 34 of the A frame and which is adapted to be driven by the speed reducer through a chain 49 trained about a spur gear 50 fixed to the outgoing end of the speed reducer shaft and sprocket 46. A shaft 52 rigid with the sprocket 46 is operatively connected to the wheel 30 through a driving chain 54 having one end trained about a spur gear on the shaft 52 while the other end is trained about the sprocket 56 fixed to the stub shaft 26 on which the wheel 30 is mounted. The wheel 32 is similarly driven for rotational movement in the same direction as by means of a chain 58 trained about another spur gear on the shaft 52 and a sprocket 60 fixed to the shaft on which the wheel 32 is mounted.

The driving motor 40 is a reversible motor so that the mobile tower can be interchangeably driven in one direction or the other. Thus, responsive to rotation of the motor in one direction, the reducing gear 42 will be turned in one direction to cause the land-engaging wheels to both turn in the same direction and propel the mobile tower over the ground. Reversal of the driving motor will cause the land-engaging wheel to turn in the opposite direction together to reverse the direction of movement of the mobile towers.

Thus the direction of tower movement (forward or reverse) is controlled by the direction of rotation of the driving motor (clockwise or counterclockwise). Motor rotation is, in turn, determined by the respective phase relation of the electrical power. The motor 40 is energized by the operation of the magnetic motor starter MS and is protected from accidental overload and subsequent damage by the overload current devices such as overload heater coils of the magnetic motor starter. The alignment switch, hereinafter described, controls the operation of the magnetic motor starter and subsequently the movement of the tower itself.

In the illustrated modification, the motor 40 is a three phase motor connected to a three phase power supply including phase lines A, B and C, while the magnetic motor starter is controlled via the alignment switch 82 by the control power lines identified in the drawings as the common neutral line N, reverse control line R, and forward control line F.

In the preferred construction, the driving motor on the outermost tower TO is connected for continuous or intermittent operation, depending on desired operational speed, in one direction or the other, as selected by the operator or by suitable switching mechanisms. Operation of the driving motors of the intermediate towers depends upon the relative position of the intermediate towers with respect to the outer tower as the control.

In accordance with an important concept of this invention, such automatic alignment means comprises a flexible cable 62 which is fixed at its inner end 64 to an arm 66 which extends laterally from the pivot while the outer end 68 is fixed to the end portion of a laterally extending cross beam 70 on the outermost tower so that the flexible cable 62 will extend in essentially a straight line from said pivot to said outermost tower.

Figure 4:
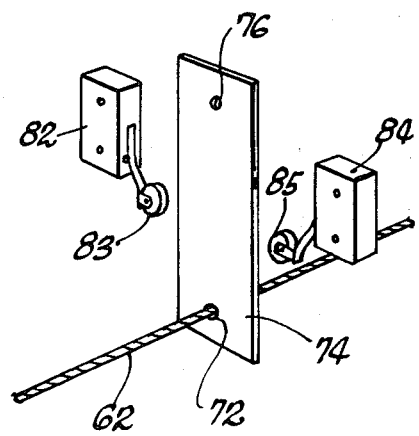
FIG. 4 is a perspective view showing in detail the control and switch operation for the tower drive motor responsive to the location of the intermediate tower with respect to a control.

The flexible cable is threaded through an opening 72 in a pendulum 74 that is mounted on each of the intermediate towers for free rocking movement about an axis 76 which is parallel with the axis of the pipe and in a direction crosswise of the distributor pipe. As illustrated in FIGS. 2 and 4, the pendulum 74 comprises an elongate member which is suspended to depend from the tower on a pivot pin 78 extending laterally from the end portion of a horizontally disposed cross brace member 80 rigid with the tower. The pendulum is supported on the tower at a level high enough to enable the flexible cable easily to clear the crops so that the growing crops will not interfere with the function of the cable as an alignment control. An electrical switch 82 is fixed to the cross brace member 80 with the plunger positioned in the pathway of the swinging pendulum 74. Instead of making use of a pendulum for support of the flexible cable, the intermediate portions of the flexible cable can be supported on slide bars extending crosswise between the switch members whereby reliance will be had on the cable itself to make or unmake the switch as it slides laterally over the supporting surface.

Figure 3:
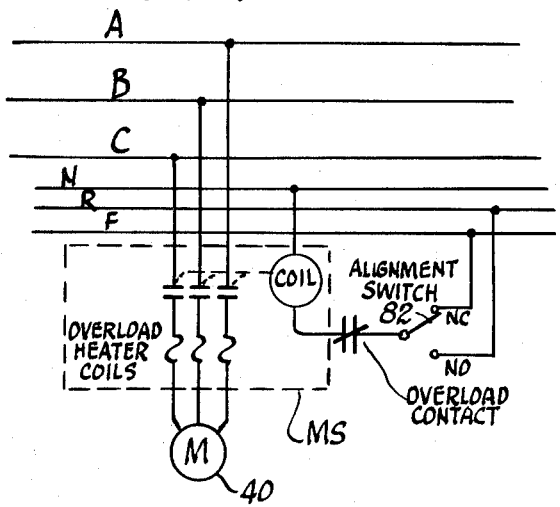
FIG. 3 is a diagrammatic view of the arrangement of elements for control of the direction of movement of the intermediate carriers.

As illustrated in FIG. 3, the common line N is connected to one terminal of the magnetic motor starter while the forward control line is connected to one pole of the switch which, when the switch is closed, establishes connection with the other pole of the relay to effect operation for forward movement of the tower and which, when open, disengages the forward control wire from the magnetic motor starter to stop operation thereof. The reverse control line is connected to the other pole of the switch or preferably to a separate switch mechanism 84 located inwardly of the pendulum and with the same connection whereby, when the switch 84 is closed, connection is established between the reverse control line and the magnetic motor starter to effect operation in the reverse direction and, when the switch is open, the reverse control line is disconnected from the motor to terminate the operation thereof.

Thus, when the intermediate mobile tower is in proper alignment, the pendulum will be suspended from its pivot to hang downwardly substantially perpendicularly so that the pendulum will be free of the plunger of switch 82 as well as the plunger of switch 84.

When the forward control line F is the hot line for forward movement of the mobile tower and the pendulum hangs downwardly out of engagement with the plunger 83 of the switch 82, a voltage is applied between the forward control line F and the common or neutral wire N, with the switch in the normally closed (NC) position. The three-phase power is energized with the phase relation A-B-C to effect operation for corresponding forward movement of the mobile tower along with the outermost tower. As long as alignment continues and the pendulum 74 hangs free of the plunger 83 of switch 82, the motor 40 will continue to operate to effect forward movement of the tower.

If the particular tower advances to a position of misalignment, the cable will cause the pendulum to rock about its pivot in the clockwise direction until the pendulum engages the plunger. Engagement of the plunger operates to open the switch 82 and disconnect the forward control line F from the neutral common control line to terminate the passage of voltage therebetween. This causes an interruption in the magnetic motor starter circuit and the driving motor 40 is de-energized.

Operation of the motor and forward movement of the mobile tower will be thus discontinued as long as the pendulum engages the plunger 83 to make the switch. As the outer tower continues to move forwardly, while the intermediate tower is stationary, the cable will move forwardly with the outer mobile unit ultimately to cause the pendulum to rock forwardly about its pivot into a position out of engagement with the plunger 83. This will occur when the outer mobile unit reaches substantial alignment with the stopped intermediate mobile tower. This will release the plunger for return of the switch to NC position whereby the driving mechanism will commence operation again to effect forward movement of the intermediate mobile tower with the continued forward movement of the outer control unit.

This sequence will repeat as often as is necessary to keep the tower "in-line" with the other respective towers.

If reverse operation is desired, a voltage is applied between the reverse control wire (R) and the common or neutral (N). The three-phase motor is energized with the phase relation C-B-A. This change in relationship will cause the driving motor to run in the reverse direction.

When operating in the reverse direction the switch is in the normally open position (NO) whereby a circuit is established between the reverse control wire R and the neutral N to cause operation of the driving motor in the reverse direction. This situation will continue as long as the tower is in-line so that the pendulum hangs free of the plunger 85. As the tower advances beyond the adjacent towers or beyond the outer control tower, the control cable causes the pendulum to rock in the counterclockwise direction about its pivot until it engages the plunger 85 and breaks the circuit when the out-of-alignment becomes excessive.

This breaks the circuit between the line R and N to discontinue operation of the motor.

As the adjacent towers or outer control tower catch up to bring about the in-line arrangement, the pendulum swings clockwise to release the plunger 85 for return of the switch to normal open position for re-energization of the motor with corresponding reverse movement of the tower.

This sequence will repeat as often as is necessary to keep the tower in-line with the other respective towers.

It will be apparent that the direction of travel is controlled by the respective phase relationship of the electrical supply. It will also be apparent that a voltage is applied to the proper control wire which corresponds to the desired direction of travel.

It will be apparent that the motors of the intermediate towers will operate to effect movement of the intermediate towers in one direction or the other when the intermediate tower is in substantial alignment with adjacent towers and in-line with the outer control tower and that the driving motor of any intermediate tower will automatically cease to operate in response to movement of the intermediate tower beyond the position of the control cable in the direction of movement. The distance at which such controls become effective to effect stopping and starting of the driving motors may be varied but, in the preferred practice, it is desirable to stop the operation of the driving motor of an intermediate tower when the tower advances out of alignment by an amount corresponding to 2 to 10 feet.

It will be understood that the assembly may include other elements such as safety control which operates to discontinue all of the electrical circuits in the event that a motor fails to operate and a tower lags too far behind or in the event that a motor continues to operate out of control whereby the intermediate tower travels too far ahead. Such additional additional controls and elements have not been described in this application which is addressed primarily to the control means for alignment of mobile towers in normal operation.

It will be apparent that the direction of movement of the mobile towers and their supported distributor pipe can be reversed merely by reversal to make one or the other of the control lines F or R the hot line with the common or neutral line N, and the independent reversal of the driving motor. Such reversal operation can be controlled by switch means to reverse their direction when the traveling irrigation system has traversed a predetermined segment of the area capable of being covered or to reverse the direction to avoid an obstruction such as a house, barn, trees or the like.

It will be understood that changes may be made in the details of construction and arrangement without departing from the spirit of the invention, especially as defined in the following claims.

We claim:

1. A mobile irrigation apparatus comprising an elongate horizontally disposed water distributing pipe, an inlet at one end for the introduction of water under pressure, a plurality of discharge nozzles spaced along said distributing pipe between its ends for spraying water as the distributing pipe is carried over the land, a main mobile support adjacent the other end of the distributing pipe and means mounting a portion of the distributing pipe thereon for support and for movement therewith, a plurality of intermediate mobile supports in laterally spaced apart relation along the length of the distributing pipe between the inlet end and the main mobile support for support of the distributing pipe at corresponding laterally spaced apart portions, individual motor drive means on each support for actuation of the mobile supports individually for movement in the forward or rearward directions, means for maintaining alignment between the intermediate supports and the main support during continuous operation of the main support in the forward or rearward direction comprising a flexible cable extending substantially parallel to the distributing pipe from the inlet end to the main support and attached thereto, means on each intermediate support for controlling operation of the motor drive means on the respective intermediate support, and switch means having switch operating elements in position to be responsive to the cable to discontinue operation of the drive means in response to movement of the intermediate support out of alignment with the main or adjacent supports to a position a predetermined distance in advance in the direction of movement of the main support to discontinue operation of the power operated drive means and to initiate operation of the motor drive means responsive to return of the intermediate support into position of alignment whereby it continues to travel with the main support in the direction of movement thereof while in alignment therewith.

2. A mobile irrigation apparatus as claimed in claim 1 in which the inlet end of the distributing pipe represents a pivotal point about which the distributing pipe circulates as it is carried by the main and intermediate supports.

3. A mobile irrigation apparatus as claimed in claim 1 in which each intermediate support includes a pendulum suspended from a pivot fixed to the support for free rocking movement of the pendulum about an axis parallel with the axis of the distributing pipe and in a direction corresponding to the movement of the support, an opening in a portion of the pendulum offset from the pivot through which an intermediate portion of the flexible cable extends for effecting rocking movement of the pendulum responsive to movement of the support relative to adjacent supports and the main support, and switch operating means in the path of movement of the pendulum to effect operation of the switch means responsive to movement of said pendulum.

* * * * *